United States Patent [19]

Okamoto et al.

[11] Patent Number: 4,460,760

[45] Date of Patent: Jul. 17, 1984

[54] ANAEROBICALLY CURABLE COMPOSITIONS

[75] Inventors: Takanori Okamoto, Nakatagodgun; Takaharu Onishi; Hideaki Matsuda, both of Marugame, all of Japan

[73] Assignee: Okura Kogyo Kabushiki Kaisha, Japan

[21] Appl. No.: 389,437

[22] Filed: Jun. 17, 1982

[30] Foreign Application Priority Data

Jun. 23, 1981 [JP] Japan .................................. 56-95970

[51] Int. Cl.$^3$ ............................................. C08F 20/20
[52] U.S. Cl. .................................... 526/301; 526/192; 526/204; 526/205; 526/313; 526/320; 526/323.1; 526/323.2
[58] Field of Search ............... 526/192, 204, 205, 301, 526/313, 320, 323.1, 323.2

[56] References Cited

U.S. PATENT DOCUMENTS

| | | | |
|---|---|---|---|
| 4,034,145 | 7/1977 | Gruber | 526/323.1 |
| 4,055,542 | 10/1977 | Saito | 526/204 |
| 4,090,997 | 5/1978 | Patel et al. | 526/204 |
| 4,103,081 | 7/1978 | Repelto | 526/323.1 |
| 4,235,986 | 11/1980 | Catena | 526/323.1 |
| 4,374,940 | 2/1983 | Bhatia | 526/323.1 |

*Primary Examiner*—Harry Wong, Jr.
*Attorney, Agent, or Firm*—Jacobs & Jacobs

[57] ABSTRACT

There is provided a novel anaerobically curable composition which is less irritant, strongly adhesive to metal materials without primers and also storable for a long time without significant deterioration. The composition comprises per 100 parts of a polymerizable methacrylate, 0.1 to 5.0 parts of the salt of o-benzoic sulfimide and a specified aromatic amine, 0.1 to 5.0 parts of an acid amide, and 0 to 3.0 parts of a gelling stabilizer.

8 Claims, No Drawings

ANAEROBICALLY CURABLE COMPOSITIONS

BACKGROUND OF THE INVENTION

The present invention relates to an anaerobically curable composition having no seroxy initiators. The composition of the invention has less skin irritation and an extended shelf life. The composition cures rapidly when excluded from air.

There have been known a number of anaerobically curable compositions which are liquid in the presence of air, but are cured to a solid state upon exclusion from air. Such properties thereof are utilized for preventing bolts and screws from loosening, fixing shafts of bearings and motors, sealing piping connections, filling and repairing pinholes in cast metals and the like instead of using mechanical methods. Such applications serve to enhance production efficiency and to save energies and labors.

U.S. Pat. No. 2,628,178 discloses that such anaerobically curable compositions could be obtained by blowing air or oxygen into a polymerizable methacrylate. But the composition thus obtained had a very slow rate of adhesion and poor storage stability. U.S. Pat. Nos. 2,895,950 and 3,043,820 disclose adding a peroxide as a polymerization initiator to a polymerizable methacrylate instead of blowing air or oxygen therein, and adding quinones for improving storage stability and tertiary amines for increasing the rate of adhesion.

U.S. Pat. Nos. 3,046,262, 3,218,305 and 3,300,847, as well as Japanese Patent Publication Nos. 10855/68; 852/69; 17541/69; 15640/70; 17080/70; 26659/72; 9462/74; 41317/77; 46273/77, show compositions of improved rate of adhesion and storage stability, but these compositions all used peroxides as essential components. However, peroxides are accompanied with undesirable effects, such as causing inflammation of the skin and having bad odors. These effects are especially strong in the case of hydroperoxides which have been used usefully and most frequently in anaerobically curable compositions. To obtain an adhesive having less irritant properties, there have been proposed some methods wherein a less irritant peroxide is used or a peroxide is used in a smaller amount, or the like. These methods lower the irritant properties, but markedly worsen the essential performances of anaerobically curable compositions such as adhesion strength and rate of adhesion.

Japanese Patent Publication Nos. 19390/70; 19391/70 and 597/76 propose that anaerobically curable compositions can be obtained even in the absence of peroxides. These compositions can cure and bond adjacent surfaces, but have an unsatisfactory rate of adhesion and adhesive strength. In addition, they give rise to undesirable handling problems because of additives used in place of peroxides. Heretofore, it has been essential that anaerobically curable compositions for practical uses contain a peroxide as a polymerization initiator.

The present inventors had previously developed anaerobically curable compositions containing no organic peroxide which was the cause for the irritant properties and succeeded in eliminating these prior art defects, as described in Japanese Patent Publication Nos. 39480/78, 47266/78, 28176/79 and 1958/80. More specifically, an anaerobically curable composition containing no organic peroxide had been obtained by adding a small amount of the salt of o-benzoic sulfimide (i.e. "Saccharin") with an amine having the following general formula (1),

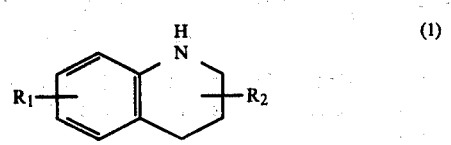

wherein $R_1$ and $R_2$ stand for hydrogen or methyl group, to a polymerizable methacrylate. The compositions thus obtained were characterized in that they had very small irritant properties, were rapidly curable and also bonded to a variety of metal materials strongly even in the absence of primers. It has been found, however, that the rate of adhesion of the compositions becomes lower when they are stored for a long period of time.

After the intensive researches on improving this defect and further enhancing the performances, the present inventors have found that a suitable amount of an acid amide incorporated into the above-mentioned compositions is very effective for enhancing the rapidly curing property as well as for prevention of deterioration in the properties after a long term storage.

SUMMARY OF THE INVENTION

In accordance with the present invention, there is provided an anaerobically curable composition of high performance which is less irritating, strongly adhesive to a variety of metal materials without a primer and also storable for a long time without significant deterioration. The present composition comprises per 100 parts by weight of a polymerizable methacrylate, 0.1 to 5.0 parts by weight of the salt of o-benzoic sulfimide with an amine represented by the above-mentioned formula (1), 0.1 to 5.0 parts by weight of an acid amide and 0 to 3.0 parts by weight of a gelling stabilizer. The present composition is useful as adhesives and the like, and can also be applied advantageously in the fields where conventional anaerobically curable compositions have been used.

DETAILED DESCRIPTION OF THE INVENTION

The polymerizable methacrylates to be used in the present invention are (a) a compound represented by the formula;

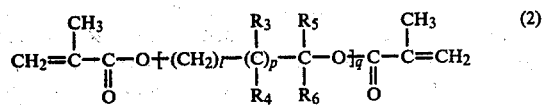

wherein, $R_3$, $R_4$, $R_5$ and $R_6$ stand for hydrogen, an alkyl group having 1 to 4 carbon atoms,

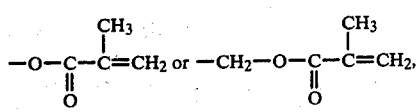

which may be the same or different; l stands for an integer of 1 to 8; p is 0 or 1, and q stands for an integer of 1 to 20;

(b) a compound represented by the formula (3);

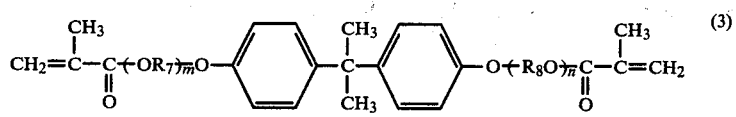

(3)

wherein, $R_7$ and $R_8$ stand for an alkylene group having 2 to 4 carbon atoms, and m and n stand for an integer of 1 to 8; or (c) a urethane polymethacrylate.

These compounds may be used alone or as mixtures thereof.

The compounds of the formula (2) are exemplified by ethyleneglycol dimethacrylate, diethyleneglycol dimethacrylate, triethyleneglycol dimethacrylate, a polyethyleneglycol dimethacrylate, propyleneglycol dimethacrylate, dipropyleneglycol dimethacrylate, a polypropyleneglycol dimethacrylate, neopentylglycol dimethacrylate, glycerin trimethacrylate, trimethylolpropane trimethacrylate, trimethylolethane trimethacrylate, butanediol dimethacrylate, and the like.

The compounds of the formula (3) are exemplified by 2,2-bis(4-methacryloxyethoxyphenyl)propane, 2,2-bis(4-methacryloxydiethoxyphenyl)propane, 2,2-bis(4-methacryloxytriethoxyphenyl)propane, 2,2-bis(4-methacryloxypropoxyphenyl)propane, 2,2-bis(4-methacryloxydipropoxyphenyl)propane, 2(4-methacryloxyethoxyphenyl)-2-(4-methacryloxydiethoxyphenyl)propane, and the like.

Urethane polymethacrylates may be prepared by any known process, but they can be readily obtained by reacting a methacrylate having hydroxyl group(s) in its molecule with a polyisocyanate compound in an approximately equimolar ratio of the hydroxyl group to the isocyanate group. The methacrylate having hydroxyl group(s) in its molecule is exemplified by hydroxyethyl methacrylate, hydroxypropylmethacrylate, hydroxybutylmethacrylate, a polyalkyleneglycol monomethacrylate, glycerine dimethacrylate, and the like. The isocyanate compound is exemplified by tolylene diisocyanate, xylilene diisocyanate, diphenylmethane diisocyanate, hexamethylene diisocyanate, an addition reaction product of polyethylene glycol and tolylnene diisocyanate in a 1:2 molar ratio, and the like.

Besides the above-mentioned methacrylates may also be used monomethacrylates such as methoxypolyethyleneglycol methacrylate, lauryl methacrylate, cyclohexyl methacrylate and 2-ethylhexyl methacrylate, or those methacrylates which have polar groups such as —OH, —NH$_2$ and —Cl groups. It is preferred, however, to use these methacrylates as an auxiliary component in combination with the above-mentioned methacrylates for regulating the adhesion strength of the resulting compositions and providing them with flexibility, because these methacrylates give undesired adhesion rates and sometimes are skin-irritating. Acrylates are not desirable in view of their strong skin-irritating property and inferior adhesion performance.

The salt of o-benzoic sulfimide with the amine represented by the formula (I) provides the polymerizable methacrylate with anaerobic curability. In addition, it also acts as an curing accelerator and as an activator for inert metal surfaces. Such effects of the salt are very peculiar when compared with the conventional anaerobically curable compositions which require an organic peroxide, curing accelerator and, moreover, a primer for inert metal surfaces. The amines represented by the formula (1) are exemplified by 1,2,3,4-tetrahydroquinoline, 1,2,3,4-tetrahydroquinaldine, 6-methyl-1,2,3,4-tetrahydroquinoline and the like. The salt of o-benzoic sulfimide with the amine can be readily prepared by addition-reaction of these components in equimolar ratio at a temperature of from room temperature to 40° C. in an inert solvent and, after completion of the reaction, either distilling off the solvent or allowing the reaction mixture to cool to give pale yellow crystals. Both o-benzoic sulfimide and the above-mentioned amines are slightly soluble in water, while the salts composed of these components are readily soluble in water. Thus, it is considered that the catalytic activity of the composition according to the present invention is enhanced by the trace amount of water which is deposited onto the surface of the adherend to provide excellent adhesion performances. Moreover, owing to the scarce odor of these salt and the absence of any organic peroxide, the resulting anaerobically curable composition has very slight odor, which is very advantageous in view of the working environments. These salts are added in an amount of 0.1 to 5.0 parts by weight, preferably 0.5 to 3.0 parts by weight, per 100 parts by weight of a polymerizable methacrylate. When the amount of the salt added is less than 0.1 part by weight, the resulting composition would be very poor in curability. On the contrary, even when the amount added is more than 5.0 parts by weight, curability of the resulting composition would not be improved; and moreover, in the case of some polymerizable methacrylates, the salts may separate out after long term storage owing to their poor solubility.

The acid amide used in the present composition acts to increase the rate of adhesion of the present composition and to prevent decrease in the rate of adhesion thereof after long term storage. In general, as a curing accelerator for an acrylic curable composition are used those compounds which act to decompose an organic peroxide to readily generate active radicals through redox reaction. However, no organic peroxide is included in the present composition and, therefore, such compounds are not useful to accelerate curing in the present composition. The present inventors have made researches on the compounds which can accelerate curing of the polymerizable methacrylate without use of an organic peroxide in the presence of the salt composed of o-benzoic sulfimide and an amine of the formula (I), and have unexpectedly found that acid amides are useful for this purpose. In general, the longer the storage time of a normal temperature-curable adhesives of one-pack type is, the slower the rate of adhesion. Contrary to this tendency, the present inventors have also found that the acid amide act to markedly inhibit deterioration in the rate of adhesion of the present composition after the long term storage. The acid amides useful for the present invention are, for example, primary-, secondary- and teritary-amides such as formamide, formethylamide, formdimethylamide, formallyamide, acetamide, acetmetylamide, acetethylamide, acetdimethylamide, acetdiethylamide, methylenediacetamide, diacetamide, diacetmethylamide, diacetethylamide, triacetamide and the like. The amount thereof to be added is 0.1 to 5.0 parts by weight, preferably 0.3 to 3.0 parts by weight, to 100 parts by weight of the polymerizable methacrylate. When it is used in an amount of less than 0.1 part by weight, no satisfactory effect is obtained. When it is more than 5 parts by weight, the rate of adhesion of the resulting composition is apt to decrease.

A gelling stabilizer is used for preventing the composition from increasing in viscosity, gelling and the like caused by polymerization during storage. The type and amount of the gelling stabilizer to be added are determined depending upon the type of the polymerizable methacrylate employed in the composition. When a polymethacrylate of a polyhydroxy alcohol having no ether linkage in its molecule (which can be represented by the above-mentioned formula (2) wherein q is 1) such as trimethylolpropane trimethacrylate is used as the polymerizable methacrylate in the present invention, no gelling stabilizer may be needed or 1 to 100 ppm of oxalic acid is suitably added. It has been found that a urethane polymethacrylate, which has been difficult to stabilize in the conventional anaerobically curable compositions, can be effectively stabilized against gelling by incorporation of magnesium or zinc salt of a carboxylic acid as the gelling stabilizer in the present composition which does not contain an organic peroxide. Such metal salts are exemplified by magnesium methacrylate, magnesium acrylate, magnesium naphthenate, magnesium salts of polyesters, zinc methacrylate, zinc acrylate, zinc octylate, zinc salts of polyesters and the like. The amount of the metal salt to be added is 0.01 to 3.0 parts by weight to 100 parts by weight of the polymerizable methacrylate. For the other polymerizable methacrylates represented by the formula (3), it is suitable to add 10 to 300 ppm of sodium salt of ethylenediaminetetraacetic acid (hereinafter referred to as EDTA.4NA). Oxalic acid may sometimes be used concomitantly therewith to enhance the stability markedly.

As described above, the present invention is to provide an excellent anaerobically curable composition which is extremely less irritant, rapidly curable and of substantially constant adhesion rate even after long term storage. It is also possible to add appropriate amounts of other additives such as colorant, thixotropic agent, thickening agent, plasticizer, etc.

The present invention is further explained in detail by way of reference examples, working examples and comparative examples, in which all parts are by weight.

REFERENCE EXAMPLE 1

Synthesis of 1,2,3,4-tetrahydroquinoline salt of o-benzoic sulfimide (hereinafter referred to as SQ salt)

Into a 4-necked 200 ml flask equipped with a reflux condenser, a thermometer and a stirrer is placed 18.3 g (0.1 mol) of o-benzoic sulfimide and 100 ml of ethyl alcohol and then 14.6 g (0.11 mole) of 1,2,3,4-tetrahydroquinoline is slowly added under sufficient stirring at room temperature. After the addition, the reaction mixture is warmed to 40° C. and further subjected to reaction for 2 hours. Thus, the reaction system becomes completely transparent. After termination of the reaction, the system is allowed to stand at 5° C. for one day. The resulting salt separated out as crystals is filtrated to remove ethyl alcohol and excess 1,2,3,4-tetrahydroquinoline. The filtrated salt crystals are dried under reduced pressure to give the dried salt in a yield of 31.0 g. The resulting salt was slightly yellow crystals having an endothermic peak at 140.5° C. by means of a differential thermal analysis. Incidentally, the value of elemental analysis of the salt is shown in the following table, which was in conformity with the calculated value of the equimolar adduct of o-benzoic sulfimide and 1,2,3,4-tetrahydroquinoline.

|  | C | H | N |
|---|---|---|---|
| Found: | 60.75% | 5.00% | 8.80% |
| Calculated: | 60.74% | 5.10% | 8.85% |

REFERENCE EXAMPLE 2

Synthesis of 1,2,3,4-tetrahydroquinaldine salt of o-benzoic sulfimide (hereinafter referred to as SQN salt)

A 4-necked 100 ml flask equipped with the same instruments as in Reference example 1 is charged with 18.3 g (0.1 mol) of o-benzoic sulfimide and 50 ml of ethyl alcohol. To the charged mixture under sufficient stirring is slowly added 16.19 g (0.11 mol) of 1,2,3,4-tetrahydroquinaldine at room temperature. After completion of the addition, the reaction mixture is stirred at 30° C. for additional 1 hour and then allowed to stand for one day. The resulting salt separated out as crystals is filtrated to remove ethyl alcohol and excess 1,2,3,4-tetrahydroquinaldine. The filtrated salt crystals are dried under reduced pressure to give the dried salt in a yield of 26.0 g. The resulting SQN salt was slightly yellow crystals having endothermic peaks at 116° C., 185° C. and 221° C. by means of a differential thermal analysis. The results of elemental analysis of the salt was in good conformity with the calculated value as in the case of Reference example 1.

|  | C | H | N |
|---|---|---|---|
| Found: | 61.75% | 5.50% | 8.50% |
| Calculated: | 61.80% | 5.49% | 8.48% |

REFERENCE EXAMPLE 3

Synthesis of 6-methyl-1,2,3,4-tetrahydroquinoline salt of o-benzoic sulfimide (hereinafter referred to as SMQ salt)

A 4-necked 100 ml flask equipped with the same instruments as in Reference example 1 was charged with 18.32 g (0.1 mol) of o-benzoic sulfimide and 20 ml of ethyl alcohol. To the charged mixture was slowly added 14.72 g (0.1 mol) of 6-methyl-1,2,3,4-tetrahydroquinoline with stirring at 35° C. After completion of the addition, the reaction mixture was further reacted for 10 minutes. Then, the ethyl alcohol was distilled off at 50° C. under reduced pressure. The system is allowed to stand at room temperature for one day to give 33.0 g of pale yellow crystals. The resulting crude product was recrystallized from ethyl ether containing a small amount of ethanol to yield 19.8 g of pale yellow prism-like crystals. The results of differential thermal analyses and the elemental analyses of both the crude product and the recrystalline product were nearly the same, as shown below. The results of the elemental analyses of these products were in good conformity with the calculated values. Thus, the crude product was used without further purification in the present invention.

| Absorption peaks in differential thermal analyses | |
| --- | --- |
| crude product | 111.0° C. |
| recrystalline product | 111.0° C. |

|  | C | H | N |
| --- | --- | --- | --- |
| Found: | | | |
| crude product | 61.50% | 5.50% | 8.60% |
| recrystalline product | 61.65% | 5.50% | 8.75% |
| Calculated: | 61.74% | 5.45% | 8.47% |

EXAMPLE 1, COMPARATIVE EXAMPLES 1 THROUGH 3

Homogeneous solutions were prepared by adding, to 100 parts of dimethacrylate of the adduct of Bisphenol A and 4 moles of ethylene oxide, 2 parts of the SQ salt, SQN salt or SMQ salt which was obtained in Reference examples, and 0.005 parts each of oxalic acid and EDTA.4Na as the gelling stabilizer and then heating the mixture to 80° C. for 10 minutes. Then 1.5 parts of an acid amide listed in the following tables was added to the solution and dissolved therein at room temperature to give an anaerobically curable composition. The properties of the resulting compositions were determined.

Gelling stability at 50° C.

In a 100 ml polyethylene vessel was charged with 50 g of the composition. Thus was determined the elapse of days required until thickening or gelling of the composition was observed in a oven at 50° C. The present inventors have confirmed that the composition will be stable at room temperature for more than one year in the case where no change is observed in 10 or more days in this test.

Setting time

M10 steel bolts and nuts have been washed with trichloroethylene and then bonded at 23° C. to each other with the composition. In order to determine setting time is measured the time required to produce such bonding that the bolt and nut cannot be loosen manually (i.e. the time required to produce a torque strength of about 10 kg-cm). It can be said that the shorter the setting time is, the higher the rate of adhesion.

Adhesion strength

The bolt and nut which were bonded to each other as described above are subjected to aging at 23° C. for 24 hours. Return torque is then measured by using a torque wrench. The average of the return torque values at ¼, ½, ¾ and 1 rotation, respectively, is adopted as the adhesion strength.

Physical property after deterioration

The composition is forced to deteriorate in a oven at 50° C. for 10 days, and then the setting time and adhesion strength are measured at 23° C. in the same way as mentioned above. If any significant change in physical properties is not observed in the composition under this condition, the composition is deemed to have one or more year shelf life at room temperature, as indicated in Japanese Adhesive Industrial Association Standards JAI6-1979.

The results of the above measurements are shown in Tables 1 through 3. Tables 1, 2 and 3 show the results of the compositions wherein the SQ salt, SQN salt and SMQ salt are employed as the salt, respectively. Comparative examples 1, 2 and 3 show the results of the masurements wherein no acid amide is added to the compositions, as shown in Table 1, 2 and 3, respectively. As evident from these results, the setting time is shortened by addition of an acid amide in all cases, and also a composition containing an acid amide has excellent physical properties even after the deterioration.

TABLE 1

| No. | salts | acid amides | gelling stability at 50° C. (day) | setting time (min.) | adhesion strength (Kg-cm) | setting time after deterioration (min.) | adhesion strength after deterioration (Kg-cm) |
| --- | --- | --- | --- | --- | --- | --- | --- |
| 1 | SQ salt | formdimethylamide | >10 | 19 | 295 | 25 | 460 |
| 2 | " | acetamide | " | 20 | 335 | 30 | 328 |
| 3 | " | acetdimethylamide | " | 19 | 320 | 28 | 313 |
| 4 | " | formdiethylamide | " | 18 | 338 | 25 | 318 |
| 5 | " | acetmethylamide | " | 20 | 318 | 30 | 410 |
| Comparative example 1 | " | no | " | 28 | 343 | 60 | 350 |

TABLE 2

| No. | salts | acid amides | gelling stability at 50° C. (day) | setting time (min.) | adhesion strength (Kg-cm) | setting time after deterioration (min.) | adhesion strength after deterioration (Kg-cm) |
| --- | --- | --- | --- | --- | --- | --- | --- |
| 6 | SQN salt | formdimethylamide | >10 | 14 | 298 | 24 | 457 |
| 7 | " | acetamide | " | 18 | 335 | 17 | 295 |
| 8 | " | acetdimethylamide | " | 20 | 282 | 23 | 280 |
| 9 | " | formdiethylamide | " | 17 | 298 | 26 | 300 |
| 10 | " | acetmethylamide | " | 21 | 355 | 25 | 320 |
| Comparative exam- | " | no | " | 31 | 322 | 65 | 345 |

TABLE 2-continued

| No. | salts | acid amides | gelling stability at 50° C. (day) | setting time (min.) | adhesion strength (Kg-cm) | setting time after deterioration (min.) | adhesion strength after deterioration (Kg-cm) |
|---|---|---|---|---|---|---|---|
| ple 2 | | | | | | | |

TABLE 3

| No. | salts | acid amides | gelling stability at 50° C. (day) | setting time (min.) | adhesion strength (Kg-cm) | setting time after deterioration (min.) | adhesion strength after deterioration (Kg-cm) |
|---|---|---|---|---|---|---|---|
| 11 | SMQ salt | formdimethylamide | >10 | 16 | 323 | 31 | 410 |
| 12 | SMQ salt | acetamide | " | 17 | 270 | 36 | 258 |
| 13 | SMQ salt | acetdimethylamide | " | 17 | 340 | 38 | 300 |
| 14 | SMQ salt | formdiethylamide | " | 16 | 295 | 40 | 443 |
| 15 | SMQ salt | acetmethylamide | " | 17 | 320 | 40 | 298 |
| Comparative example 3 | SMQ salt | no | " | 28 | 375 | >60 | 385 |

EXAMPLE 2

To 100 parts of a polymerizable methacrylate listed in Table 4 is added 2 parts of SQ salt and a specified amount of a gelling stabilizer. Then, the mixture is heated to 80° C. for 10 minutes to give a solution. After the resulting solution is cooled to room temperature, 1.5 parts of formdimethylamide is added thereto to produce a curable composition. The physical properties of the composition are measured as in Example 1. The results thereof are shown in Table 4.

COMPARATIVE EXAMPLE 4

A curable composition is prepared in the same way as in Example 2 except that no formdimethylamide is added, and the physical properties thereof are measured. The results thereof are shown in Table 5. It is evident that, owing to absence of the acid amide, the compositions of this example are inferior to those of Example 2 in both the setting time and physical properties after deterioration.

TABLE 4

| No. | polymerizable methacrylates | | gelling stabilizers and the amount thereof | | gelling stability at 50° C. (day) | setting time (min.) | adhesion strength (Kg-cm) | setting time after deterioration (min.) | adhesion strength after deterioration (Kg-cm) |
|---|---|---|---|---|---|---|---|---|---|
| 16 | trimethylolpropane-trimethacrylate | | no | | >10 | 11 | 315 | 28 | 405 |
| 17 | tetraethyleneglycol-dimethacrylate | | oxalic acid | 0.005 part | " | 9 | 310 | 10 | 310 |
| 18 | BPE · 2[1] | | oxalic acid EDTA-4Na | 0.005 part 0.005 part | " | 18 | 313 | 32 | 405 |
| 19 | BPE · 2 · 6[2] | | oxalic acid EDTA-4Na | 0.005 part 0.005 | " | 18 | 325 | 27 | 315 |
| 20 | BPE · 2 methoxypolyethyleneglycol #400 methacrylate | 50 parts 50 parts | oxalic acid EDTA-4Na | 0.005 part 0.005 | " | 7 | 170 | 15 | 255 |
| 21 | BPE · 2 tetraethyleneglycoldimethacrylate | 50 parts 50 parts | oxalic acid EDTA-4Na | 0.005 part 0.005 part | " | 10 | 328 | 12 | 400 |
| 22 | urethanepolymethacrylate[3] trimethylolpropane-trimethacrylate | 50 parts 50 parts | magnesium methacrylate | 0.2 part | " | 30 | 288 | 45 | 395 |

[1]dimethacrylate of the adduct of Bisphenol A and 2 moles of ethylene oxide
[2]dimethacrylate of the adduct of Bisphenol A and 2.6 mols of ethylene oxide
[3]the adduct of 2,4-tolylene diisocyanate and hydroxypropyl methacrylate in a molar ratio of 1:2

TABLE 5

| polymerizable methacrylates | | gelling stability at 50° C. (day) | setting time (min.) | adhesion strength (Kg-cm) | setting time after deterioration (min.) | adhesion strength after deterioration (Kg-cm) |
| --- | --- | --- | --- | --- | --- | --- |
| trimethylolpropanetrimethacrylate | | >10 | 23 | 315 | 45 | 250 |
| tetramethyleneglycoldimethacrylate | | " | 15 | 260 | 25 | 198 |
| BPE · 2 | | " | 40 | 343 | 60 | 420 |
| BPE · 2 · 6 | | " | >60 | 410 | >60 | 460 |
| BPE · 2<br>methoxypolyethyleneglycol #400 methacrylate | 50 parts<br>50 parts | " | 17 | 180 | 20 | 150 |
| BPE · 2<br>tetraethyleneglycoldimethacrylate | 50 parts<br>50 parts | " | 13 | 293 | 20 | 280 |
| urethanepolymethacrylate<br>trimethylolpropanetrimethacrylate | 50 parts<br>50 parts | " | 40 | 263 | >60 | 285 |

EXAMPLE 3, COMPARATIVE EXAMPLE 5

To 100 parts of trimethylolpropanetrimethacrylate is added 2.0 parts of SMQ salt. The mixture is heated to 80° C. for 10 minutes to dissolve the salt, cooled to room temperature and then incorporated with 0.5 to 2.0 parts of formdimethylamide to give a curable composition. The physical properties of the resulting composition are measured as in Example 1. The results thereof are shown in Table 6. Incidentally, as Comparative Example 5 is prepared a composition in the same way as the above except that formdimethylamide is not added. It is clearly shown in Table 6 that, by addition of only a small amount of the acid amide, adhesion velocity is remarkably increased and the physical properties of the resulting composition are excellent even after deterioration.

| No. | amount of formdimethyl amide added (part) | time required for gelling at 50° C. (day) | setting time (min.) | adhesion strength (Kg-cm) | setting time after deterioration (min.) | adhesion strength after deterioration (Kg-cm) |
| --- | --- | --- | --- | --- | --- | --- |
| 23 | 0.5 | >10 | 7 | 288 | 21 | 300 |
| 24 | 1.0 | " | 6 | 263 | 15 | 345 |
| 25 | 1.5 | " | 6 | 310 | 16 | 415 |
| 26 | 2.0 | " | 5 | 283 | 13 | 415 |
| Comparative example 5 | not added | " | 30 | 300 | 45 | 388 |

EXAMPLE 4

To 100 parts of trimethylolpropanetrimethacrylate is added 2.0 parts of SQ salt. The mixture is heated to 80° C. for 10 minutes to obtain a solution, cooled to room temperature and then incorporated with 1.5 parts of formdiethylamide to give a curable composition. By using the composition thus obtained, M10 bolts and nuts of the materials specified in Table 7 were bonded to each other, and the physical properties of the resulting bonded assemblies were measured as in Example 1. The results thereof are shown in Table 7. It will be seen that the composition in this example cures vary rapidly even when it is applied to a material other than iron.

TABLE 7

| materials of bolt and nut | setting time (min.) | adhesion strength (Kg-cm) | setting time after deterioration (min.) | adhesion strength after deterioration (Kg-cm) |
| --- | --- | --- | --- | --- |
| iron | 11 | 315 | 18 | 405 |
| stainless steel | 20 | 395 | 35 | 310 |
| brass | 7 | 148 | 8 | 130 |
| aluminium | 5 | 205 | 7 | 220 |
| parkerizing-treated | 4 | 178 | 6 | 190 |
| chromium-plated | 6 | 258 | 9 | 260 |
| nickel-plated | 4 | 265 | 6 | 280 |
| zinc-plated | 10 | 250 | 15 | 250 |
| phosphate-treated | 8 | 278 | 11 | 280 |

COMPARATIVE EXAMPLE 6

A curable composition having the same constitution as in Example 4 except that it does not contain formdiethylamide is prepared, and the physical properties thereof are measured as in Example 4. The results thereof are shown in Table 8. It is apparent from the table that the setting time of this composition is longer than that of the composition of Example 4.

| materials of bolt and nut | setting time (min.) | adhesion strength (Kg-cm) | setting time after deterioration (min.) | adhesion strength after deterioration (Kg-cm) |
| --- | --- | --- | --- | --- |
| iron | 23 | 315 | 45 | 250 |
| stainless steel | >60 | 325 | >60 | 375 |
| brass | 6 | 173 | 11 | 205 |
| aluminium | 7 | 213 | 9 | 220 |
| parkerizing-treated | 10 | 254 | 11 | 315 |
| chromium- | 7 | 323 | 20 | 180 |

| materials of bolt and nut | setting time (min.) | adhesion strength (Kg-cm) | setting time after deterioration (min.) | adhesion strength after deterioration (Kg-cm) |
|---|---|---|---|---|
| plated |  |  |  |  |
| nickel-plated | 7 | 310 | 8 | 228 |
| zinc-plated | 18 | 303 | 23 | 195 |
| phosphate-treated | 10 | 185 | 13 | 255 |

EXAMPLE 5, COMPARATIVE EXAMPLES 7 THROUGH 9

A urethane methacrylate is prepared by addition reaction of hexamethylenediisocyanate and hydroxypropyl methacrylate in 1 to 2 mole ratio according to a conventional method. To a polymerizable methacrylate mixture consisting of 50 parts of the urethane methacrylate and 50 parts of trimethylolpropanetrimethacrylate are added 2 parts of SMQ salt and 2.0 part of zinc methacrylate as a gelling stabilizer. The resulting mixture is heated to 80° C. for 10 minutes to obtain a solution. The resulting solution is allowed to cool to room temperature and then incorporated with an acid amide to give a curable composition. The physical properties thereof are measured as in Example 2. The results are shown in Table 9. Comparative Examples 7 through 9 show the corresponding systems wherein an acid amide is replaced by a tertiary amine which has been conventionally employed as a curing accelerator for anaerobically curable compositions. It is apparent from the results in Table 9 that curing cannot be accelerated at all; rather the rate of adhesion is reduced markedly by using a tertiary amine instead of an acid amide in the composition of the present invention wherein no organic peroxide is contained.

TABLE 9

| No. | curing accelerator | gelling stability at 50° C. (day) | setting time (min.) | adhesion strength (Kg-cm) | setting time after deterioration (min.) | adhesion strength after deterioration (Kg-cm) |
|---|---|---|---|---|---|---|
| 27 | acetdimethylamide | >10 | 10 | 395 | 20 | 325 |
| 28 | formamide | " | 10 | 398 | 18 | 376 |
| 29 | acetamide | " | 10 | 352 | 23 | 313 |
| Comparative example 7 | triethylamine | " | >60 | 335 | >60 | 345 |
| Comparative example 8 | N,N—dimethylaniline | "18 | 388 | >60 | 330 |  |
| Comparative example 9 | N,N—dimethyl-p-toluidine | " | 22 | 330 | >60 | 285 |

What is claimed is:

1. An anaerobically curable composition which consists essentially of per 100 parts by weight of a polymerizable methacrylate: 0.1 to 5.0 parts by weight of the salt of o-benzoic sulfimide with a hetereocyclic, secondary amine of the formula (1)

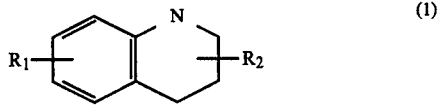

wherein $R_1$ and $R_2$ are hydrogen or a methyl group; 0.1 to 5.0 parts by weight of an acid amide; and 0. to 3.0 parts of a gelling stabilizer.

2. The composition according to claim 1, in which the polymerizable methacrylate is
   (a) a compound represented by the general formula (2),

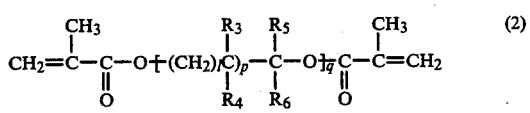

wherein, $R_3$, $R_4$, $R_5$ and $R_6$ stand for hydrogen, an alkyl group having 1 to 4 carbon atoms,

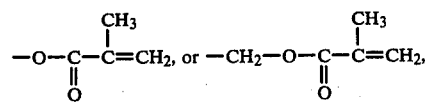

respectively, which may be the same or different, l stands for an integer of 1 to 8, p is 0 or 1, and q stands for an integer of 1 to 20;
   (b) a compound represented by the general formula (3),

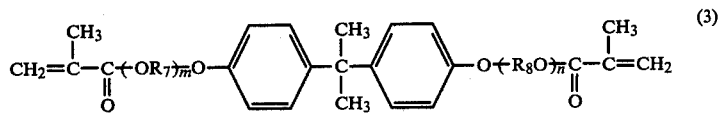

wherein, $R_7$ and $R_8$ stand for an alkylene group having 2 to 4 carbon atoms, and m and n stand for an integer of 1 to 8; or (c) a urethane polymethacrylate, or a mixture of two or more thereof.

3. The composition according to claim 1, in which the acid amide is formdimethylamide.

4. The composition according to claim 2, in which no gelling stabilizer is added or 0.0001 to 0.01 part by weight of oxalic acid is present as said gelling stabilizer per 100 parts by weight of the polymethyacrylate of said compound represented by said general formula (2),

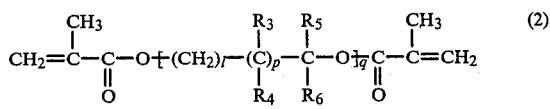

wherein q stands for 1 and the other variables are as specified in claim 2.

5. The composition according to claim 1 in which 0.01 to 3.0 parts by weight of magnesium or zinc salt of a carboxylic acid is present as said gelling stabilizer per 100 parts by weight of the polymerizable methacrylate.

6. The composition according to claim 1 in which 0.001 to 0.03 part by weight of the sodium salt of ethylenediaminetetraacetic acid is present as said gelling stabilizer per 100 parts by weight of the polymerizable methacrylate represented by the general formula (3),

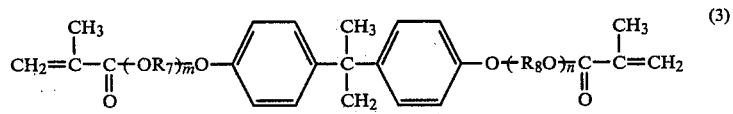

wherein $R_7$ and $R_8$ stand for alkylene group having 2 to 4 carbon atoms, and m and n stand for an integer of 1 to 8.

7. The composition according to claim 1, wherein said amine of formula (1) is 1,2,3,4-tetrahydroquinoline, 6-methyl-1,2,3,4-tetrahydroquinoline or 1,2,3,4-tetrahydroquinaldine.

8. The composition according to claim 1, wherein said salt of o-benzoic sulfimide and said amine of formula (1) is present in an amount of 0.5 to 3.0 parts by weight per 100 parts by weight of said polymerizable methacrylate.

* * * * *